Feb. 28, 1961 O. H. BANKER 2,973,121
CONTINUOUS FUEL SUPPLY MEANS FROM ONE OR MORE TILTABLE TANKS
Filed Oct. 15, 1956
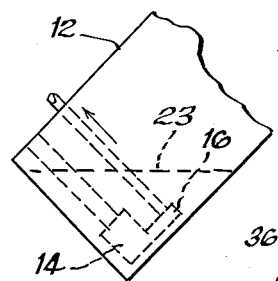
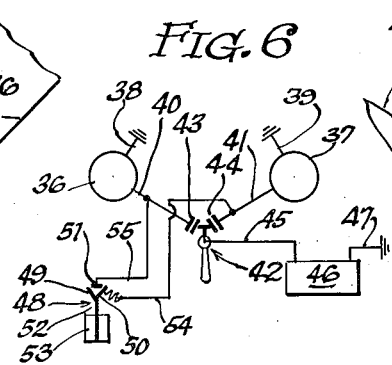
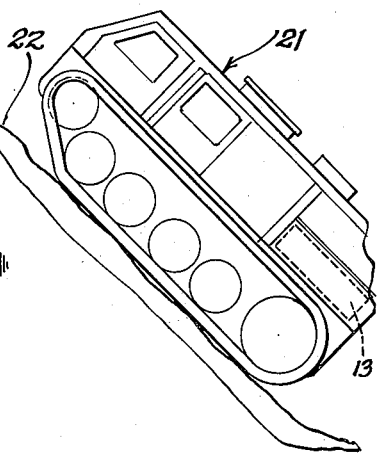
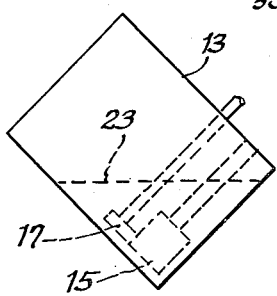
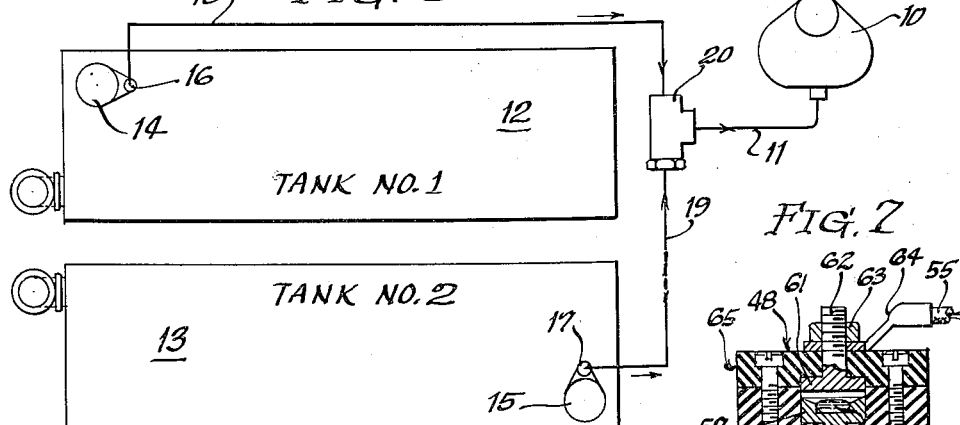
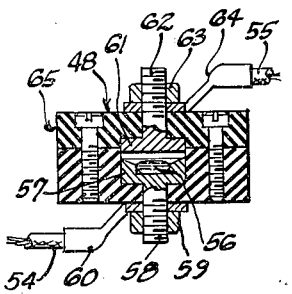
INVENTOR.
Oscar H. Banker
BY
Charles F. Vrtech
Attorney

United States Patent Office 2,973,121
Patented Feb. 28, 1961

2,973,121

CONTINUOUS FUEL SUPPLY MEANS FROM ONE OR MORE TILTABLE TANKS

Oscar H. Banker, Evanston, Ill., assignor, by mesne assignments, to Fawick Corporation, Cleveland, Ohio, a corporation of Michigan Filed Oct. 15, 1956, Ser. No. 615,833

7 Claims. (Cl. 222—135)

This invention relatest to a continuous fuel supply means from one or more tiltable tanks. For purposes of illustration this invention will be described with reference to its application to a land vehicle designed to traverse uneven terrain such as an army tank or the like. It is understood, however, that the invention is not limited to such use but may be used generally wherever liquid is to be drawn from transportable tanks which may at times assume a canted position in any direction from a normal horizontal position. Thus the invention is applicable to fuel tanks for aircraft and marine craft as well as for land vehicles.

Prime movers dependent upon fuel from tanks which are portable and hence subject to the irregularities in the media in which they may be transported may at times have an adequate supply of fuel while the tanks are in a horizontal position, but may become starved or completely devoid of fuel when the tanks are only partially filled and are inclined to the horizontal, due to the fact that the intake for the engine in the tank may at times be immersed in the fuel and at other times may find itself above the fuel level in the tank. This is especially true where the tanks are formed with a flat, or substantially flat, bottom. When the prime mover is starved for fuel it either runs erratically, or ceases to function entirely, may create a dangerous situation for those dependent upon continuous power from such prime mover.

An object of this invention is the provision of a fuel feeding system including one or more portable tanks which system will continue to feed fuel to a prime mover after the tanks are partially empty and while the tanks are tilted away from their normal horizontal position.

Where dual fuel tanks are used it has been proposed to draw the fuel from the tanks by submerged electrically driven pumps, one in each tank, and as another object this invention seeks to provide an automatically operable selector valve, in conjunction with predetermined locations for the pumps in the tanks, wherein the selector valve will automatically select that pump of the two which at the moment is submerged in the fuel and capable of continuing to supply fuel to an engine or the like while cutting off from the engine fuel supply line the pump which may at the moment be elevated above the level of the fuel in its tank.

In some instances, to conserve energy where dual tanks and dual electrically operated fuel pumps are employed, it is desirable to operate but one pump at a time and by suitable switching means, to cut in the second fuel pump when the first has exhausted the fuel in its tank. It is accordingly a further object of this invention to provide an automatically operable control system for a dual, electrically driven, fuel pump arrangement wherein a continuous supply of fuel is assured regardless of which pump is at the moment in operation, whenever the operating pump becomes temporarily starved or ineffective due to a tilting of its tank.

As a specific object this invention has within its purview the provision of an electric switch which normally creates a break in a circuit, but, upon a tilting of the switch in any direction away from horizontal, will establish a circuit therethrough.

These and other objects of this invention will become apparent from the following detailed description when taken together with the accompanying drawings in which, Fig. 1 is a schematic plan view of a dual fuel tank arrangement incorporating the features of this invention;

Fig. 2 is an enlarged quarter sectional view of a selector valve which may be employed in the system of Fig. 1;

Fig. 3 is an illustration of a vehicle travelling over a steeply inclined surface, thereby creating a tilting condition in its fuel tanks of the kind for which the present invention is designed;

Figs. 4 and 5 are fragmentary end and side elevational views, respectively, of one or the other of the pumps shown in Fig. 1, said elevations showing the pumps and their associated tanks in a tilted condition;

Fig. 6 is a schematic wiring diagram for the pumps of Fig. 1 when the pumps are designed to be operated one at a time; and Fig. 7 is an enlarged cross section through a tilt sensitive switch which may be used in the circuit of Fig. 6.

For purposes of illustration, this invention will be described with reference to its application to an army tank, but it is understood that it is applicable to other vehicles whether travelling on the ground, in the air or on sea. Furthermore, it will be described with reference to a fuel system for a vehicle, but it may be applied equally as well to the production of a constant flow of liquid of any nature such for example as insecticides and fungicides to be sprayed on plants; liquid fertilizers; oils and other liquid coatings for roads, etc. The embodiment chosen to illustrate this invention incorporates two tanks, but the invention may be applied with equal facility to a single relatively flat tank, or to systems using more than two tanks.

Referring now to Fig. 1 for a general description of the invention, there is shown schematically a carburetor 10 of an internal combustion engine having a fuel intake line 11 connected thereto. The fuel is stored in two tanks 12 and 13 from which it may be withdrawn by individual pumps 14 and 15 having outlet connections 16 and 17 and pipes 18, 19 leading from the connections 16 and 17, respectively, to a selector valve 20, the outlet of which is connected to fuel intake line 11. Tanks 12 and 13 may have any desirable contour but are shown as being generally rectangular in plan view and provided with a substantially flat bottom. The tanks are preferably installed either in a horizontal position, that is, with their bottom surfaces generally horizontal or with a slight slope toward the pump installed therein. When mounted in a land vehicle such as an army tank, truck, caterpillar tractor, etc., they may be disposed in spaced-apart relation along opposite side of the vehicle, partly for greater accessibility and partly to distribute the weight of the contained fluid in a manner to lend greatest ability to the vehicle. When installed in an army tank, for example, where space is at a premium the tanks are generally made of an elongated form which then renders them particularly sensitive to fore-and-aft tilting.

Referring to Fig. 3, there is shown an army tank 21 which may be moving either up or down a grade 22 such as may be normally encountered in army maneuvers. Present designs to tanks have been refined to the point where they are capable of negotiating grades of as much as 60% or more. It is readily apparent that an elongated fuel tank arranged with its longest dimension in a fore-and-aft position relative to the vehicle and only partly filled with fuel might have its fuel pump above the level of the fuel if the pump were located at the upper end of the vehicle. If, to attempt a compromise, pump 14 were placed in the middle of the tank, such location would still create a starved condition in the line leading from the pump after the level of the fluid fell to the point where at a 60% slope the pump would again be elevated above the level of the fuel. Continued operation of the tank with a diminished fuel supply would create a hazardous condition for the occupants of the tank whenever the tank encountered a 60% grade. The net result of such condition is that the tank capacity to all intents and purposes is reduced by an amount equal to the volume of fuel carried which is unavailable to the fuel pump when the vehicle is travelling up or down a 60% grade.

Although the longest dimension of the tanks shown in Fig. 1 is disposed in a fore-and-aft position with respect to the army vehicle 21, the same starved condition obtains when the tank is tilted sideways, that is, when it is travelling along the side of a hill or grade at a relatively fixed elevation. This condition is illustrated in Fig. 4 which shows tank 13 in end elevation looking to the right in Fig. 1. Pump 15 and its outlet opening 17 are shown in dotted outline. It may be observed that in the position shown, that is, with tank 13 tilted to the right at an angle to the vertical of approximately 45°, the level of the fuel 23 when the tank is only partly filled will be above the pump 15. Should the tank 13 be tilted in the opposite direction an equal amount, the level of the fuel very probably would not be above the intake for the pump 15, and hence a failure of the fuel supply would result.

Fig. 5 shows a similar condition in connection with tank 12 when said tank is inclined in a fore-and-aft direction. For example, when tank 12 is inclined in such manner that its right hand end as viewed in Fig. 1 is elevated and the fuel level in the tank is low, pump 14 is still below the level of the fluid 23, and the pump may continue to supply fuel to carburetor 10. When the condition is reversed, however, and the left hand end of tank 12 as viewed in Fig. 1 is elevated, then pump 14 is entirely above the fuel level and consequently is unable to deliver fuel to carburetor 10.

The foregoing conditions of tilt, either in a fore-and-aft or sidewise direction, may be neutralized and a supply of fuel at one or the other of the pumps 14 or 15 assured by locating pump 14 in the upper left hand corner of tank 12 as viewed in Fig. 1, and locating pump 15 in the lower right hand corner of tank 13 as viewed in the same figure. In addition, an automatic selector valve 20 is then used to close whichever pipe 18 or 19 is empty of fuel and open the pipe containing fuel to intake line 11 for carburetor 10. With such an arrangement, when the tanks 12 and 13 are tilted forwardly and downwardly, that is, with the right hand ends thereof as viewed in Fig. 1 lower than the left hand ends thereof, pump 14 may be above the fuel line, but pump 15 will definitely be covered with fuel even though the tanks are almost empty, and through a proper automatic functioning of valve 20, pump 15 will supply fuel to line 11 and pipe 18 will be closed. If the condition should be reversed and the tanks 12 and 13 be canted in a manner to raise their right hand ends as viewed in Fig. 1, then pump 15 will be above the fluid level and will not be effective to deliver fuel to pipe 19, but pump 14 will be immersed in the remaining fuel and will continue to deliver fuel through pipe 18 and selector valve 20 to fuel intake line 11, assuming again that selector valve 20 has automatically shifted so as to open pipe 18 and close pipe 19 to line 11 to said fuel intake line 11. The same conditions obtain when the tank is tilted sideways either to the right or left. If tank 12 is elevated above tank 13, pump 15 will still be immersed in the fluid and will continue to supply the fuel to selector valve 20, while if tank 13 is elevated above tank 12, then pump 14 will be immersed in the fuel and will continue to supply the fuel to selector valve 20.

It is apparent that the above relationship between partially filled tanks and their respective pumps at various angles of the tanks applies to a single tank having two pumps therein disposed in the same relative positions with respect to said single tank.

The continuous supply of fuel to fuel intake line 11 as described above is predicated upon the automatic functioning of selector valve 20. One such valve is shown and described in detail in my prior application Serial No. 557,510, filed January 5, 1956, and to complete the description herein is shown in quarter section in Fig. 2. Referring now to Fig. 2, selector valve 20 is comprised of a body 24 having opposed inlet openings 25, 26 and a side outlet opening 27. Inlet opening 25 is connected to pipe 18, inlet opening 26 is connected to pipe 19, and outlet opening 27 is connected to fuel intake line 11. A pressure responsive plunger 28 is axially slidable in a bore 29 and is provided with axial recesses 30 and 31 and connecting cross bores 32 and 33, respectively, through which the fluid or fuel may flow around the plunger and into opening 27.

Plunger 28 is shown in Fig. 2 is its neutral or central position in which fluid may flow simultaneously from both inlet openings 25 and 26 around the plunger into outlet opening 27. If pumps 14 and 15 are both operating and both are immersed in the fuel, both will be supplying the fuel through the pipes 18 and 19 to selector valve 20, and assuming that the pumps are of equal size and are delivering equal quantities of fuel, plunger 28 will assume the position shown in Fig. 2. Should one or the other of the pumps 14, 15 become elevated above its fuel level so that it no longer supplies fuel to selector valve 20, the other pump will then be pumping against compressible air and will move plunger 28 to the limit of its travel to close off the empty line. Plunger 28 is provided with annular O ring seals 34, 35, which effectively close the space between the plunger and the valve body when the plunger is in one or the other of its extreme positions in bore 29 and thus makes possible a continuous flow of fluid through the selector valve.

The details of construction and operation of selecetor valve 20 are described in the aforesaid copending application and hence will not be detailed further herein.

Obviously, the intended functioning of the pumps and selector valve as described above is dependent upon the presence of some fuel in both tanks and also upon the continuous simultaneous operation of pumps 14, and 15, whether they be pumping fuel at the moment or not. In some vehicles, however, it is desired to conserve the electrical energy required to drive the pumps and hence the operator of the vehicle will switch on one of the pumps only and will leave the other pump idle. Under these conditions, should the idle pump be the only one which at the moment is covered with fuel due to a canting of the vehicle in a direction to raise the running pump above its fuel level, then even though the arrangement of fuel pumps and tanks described above is used, there will nevertheless be a cessation of flow of fuel to selector valve 20 and fuel intake line 11. This condition may be obviated by the mechanism hereinafter to be described.

Referring now to Fig. 6, the motors for pumps 14 and 15 are shown diagrammatically at 36 and 37, respectively. One side 38 and 39 of each motor is grounded and the other side 40, 41, respectively, is connected to a single pole double throw switch 42 having a pair of contacts 43 for completing a circuit through the switch to motor 36 and a pair of contacts 44 for completing a circuit through the switch to motor 37. The pole of the switch 42 is connected through a line 45 to a battery 46 or other source of electrical energy which in turn is connected through a line 47 to ground.

From the electrical circuit thus far described in connection with Fig. 6 it may be observed that when switch 42 is operated to close contacts 43, the circuit from ground through battery 46 and switch 42 is completed through motor 36 and its ground connection 38 to set motor 36 in operation and effect the operation of pump 14. At the same time, the circuit through contacts 44 is broken so that motor 37 is inoperative and hence pump 15 is idle. Similarly, motor 37 and its pump 15 are rendered operative by operating switch 42 to close contacts 44 and to break contacts 43.

Should motor 36 be operative while motor 37 is inoperative and the vehicle is then canted to raise pump 14 out of its fuel, it then becomes necessary to set motor 37 in operation to insure a continuous supply of fuel. This is done automatically by the switch shown in Fig. 7 which is sensitive to inclination from the horizontal in such manner that while the switch is in a horizontal positon contact therethrough is broken but when the switch is inclined in any direction, whether fore-and-aft, sidewise or any combination of the two, from the horizontal, then a circuit is completed automatically through the switch.

The switch of Fig. 7 is shown diagrammatically at 48 as a pair of spaced contacts 49, 50 disposed on either side of a single contact 51, with spaced contacts 49 and 50 pivoted at 52 and connected to the equivalent of a pendulum 53. Pivot 52 is a universal pivot so that pendulum 53 may swing in any direction. Contact 50 is connected through a line 54 to line 41 and contact 51 is connected through a line 55 to line 40. Thus when the vehicle is inclined to cause pendulum 53 to swing and close contacts 50 and 51, line 40 and 41 will be connected in parallel with switch 42 and ground regardless of which contacts 44 or 43 may be closed at the moment. This means that during the interval of the tilt of the vehicle, both motors 36 and 37 will be rendered operative, but while the vehicle is travelling along a level road, or one having but a slight incline, only the pump selected will be operative. With both motors running simultaneously the conditions described with reference to Fig. 1 with motors 14 and 15 operating at the same time will obtain and an uninterrupted supply of fuel will be had at carburetor 10.

A switch 48 suitable for the purpose described with reference to Fig. 6 is shown in detail in Fig. 7. Thus the switch may comprise a small quantity of mercury 56 disposed in a container 57 of conducting material and having a threaded stem 58 to which may be fastened by a nut 59 the terminal 60 of line 54. Directly above container 57 is an electroconductive plate 61 having a threaded stem 62 to which is secured by a nut 63 the terminal 64 of line 55. Container 57 and plate 61 are mounted in a two part non-conducting housing 65 disposed in a horizontal position i.e. with the plane of plate 61 horizontal in army tank 21, or in whatever vehicle the tanks 12 and 13 are mounted.

Since the mercury 56 is in a liquid state, the tilting of the housing 65 and its plate 61 out of the horizontal position due to the movement of the vehicle upon inclined terrain causes the mercury to flow partly out of the container and contact plate 61 thereby establishing a circuit through plate 61 and container 57 and thus connecting electrically line 54 and 55. It may be observed that the shape of container 57 is relatively immaterial to the operation of the switch as long as the mercury is disposed below the plate 61, and that regardless of the direction of the inclination from horizontal, the movement of mercury 56 will follow. If the inclination is sufficient, contact will be established between mercury 56 and plate 61 to complete the circuit between lines 54 and 55 as aforesaid. Just as soon as the vehicle and switch 48 are restored to a substantially horizontal position, contact between plate 61 and mercury 56 is broken and the single pump operation is restored.

With the single pump operation and the use of switch 48 and its connecting lines 54 and 55, the continued operation of one of the pumps 14 and 15 while said pump is above the level of fuel in its tank causes no harm or malfunction of the remaining apparatus since selector valve 20 will at such time be moved by the fuel from the pump which is immersed in the fuel to close the empty line.

Thus it may be apparent from the foregoing description that the dual immersed fuel pump system is applicable to such systems wherein both pumps are simultaneously in operation at all times as well as to one wherein but one pump is operating at a time to conserve electrical energy. It should also be apparent that the combination and disposition of parts described above is effective where two pumps are used for a single tank, and with either single or dual tanks for vehicles other than army tanks, such as trucks, aircraft, ships, landing craft, etc. The scope of the invention therefore should not be limited to the foregoing description but should be determined by the appended claims.

I claim:

1. In combination, container means for a liquid, said container means having a substantially flat normally level bottom wall, oppositely facing side walls and oppositely facing end walls, a pair of simultaneously operating pump means in the container means adjacent the bottom wall and disposed one in the corner formed by the intersection of one side wall and one end wall and the other in the corner formed by the intersection of side and end walls respectively opposite the first-mentioned side and end walls, a common outlet pipe, and means connecting the output of the pair of pump means to the outlet pipe.

2. In combination, container means for a liquid, said container means having a substantially flat normally level bottom wall, oppositely facing side walls and oppositely facing end walls, a pair of simultaneously operating pump means in the container means adjacent the bottom wall and disposed one in the corner formed by the intersection of one side wall and one end wall and the other in the corner formed by the intersection of side and end walls respectively opposite the first-mentioned side and end walls, a common outlet pipe, said pair of pump means being adapted to deliver liquid under pressure to the outlet pipe, and fluid pressure differential operated means for controlling the delivery of liquid from the pair of pump means to the outlet pipe.

3. In combination, container means for a liquid, said container means having a substantially flat normally level bottom wall, oppositely facing side walls and oppositely facing end walls, a pair of pump means in the container means adjacent to the bottom wall and disposed one in the corner formed by the intersection of one side wall and one end wall and the other in the corner formed by the intersection of side and end walls respectively opposite the first mentioned side and end walls, a common outlet pipe, said pair of pump means being adapted to deliver liquid under pressure to the outlet pipe, individual electrically operated means for driving the pair of pump means, manually operable means for normally rendering but one electrically operated means effective at a time, means including a tilt-sensitive member movable with the container means and responsive to the tilting of said member out of a predetermined plane for rendering both pump means simultaneously effective to deliver liquid to the outlet pipe, and fluid pressure differential operated means for controlling the delivery of liquid from the pair of pump means to the outlet pipe.

4. In combination, a pair of containers for a liquid, means mounting said containers in substantially fixed relation to one another, each of said containers having a substantially flat bottom wall and opposed pairs of intersecting side and end walls, simultaneously operating pump means in both containers, a common outlet for the liquid from bath containers, one of said pump means being disposed in the corner formed by the intersection of a side and end wall of one container and the other being disposed in the corner formed by the intersection of side and end walls of the other container which face in directions opposite the directions faced by the first-mentioned side and end walls, and means for connecting each of said pump means to said common outlet.

5. In combination, a pair of containers for a liquid, each of said containers having a substantially flat normally level bottom wall and parallel side and end walls and disposed with the opposed side walls of one container parallel with the opposed side walls of the other container such that the farthermost walls of the two containers define the four corners of a rectangle, simultaneously operating pump means in both containers, disposed in diagonally opposite corners of said rectangle, a common outlet for the liquid, and pressure differential operated selector valve means for controlling the connection of the output of each pump means to the common outlet.

6. In combination, a pair of containers for a liquid, each of said containers having a substantially flat normally level bottom wall, and parallel side and end walls and disposed with the opposed side walls of one container parallel with the opposed side walls of the other container, simultaneously operating pump means in both containers disposed at opposite ends of oppositely facing walls of the containers, a common outlet for the liquid, and pressure differential operated selector valve means for controlling the connection of the outlet of the pump means to the common outlet.

7. In combination, a pair of containers for a liquid, each of said containers having a substantially flat normally level bottom wall, and parallel side and end walls and disposed with the opposed side walls of one container parallel with the opposed side walls of the other container, pump means in each container disposed at opposite ends of oppositely facing walls of the containers, a common outlet for the liquid, electrically operated means for driving the pump means, a source of electrical energy, manually controlled switch means for normally connecting one or the other of the electrically operated means to said source, switch means for connecting the pump means in parallel, said last mentioned switch means including tilt-responsive means movable with the containers and responsive to a tilting of the last mentioned switch means out of a predetermined plane for rendering both electrically operated means simultaneously effective, and pressure differential operated selector valve means for controlling the connection of the outlet of the pump means to the common outlet.

References Cited in the file of this patent
UNITED STATES PATENTS

| | | |
|---|---|---|
| 1,581,595 | Osborne | Apr. 20, 1926 |
| 2,311,955 | Merker | Feb. 23, 1943 |
| 2,332,007 | Parker et al. | Oct. 19, 1943 |
| 2,394,431 | Curtis et al. | Feb. 5, 1946 |
| 2,409,245 | Black | Oct. 15, 1946 |
| 2,519,968 | Jordan | Aug. 22, 1950 |
| 2,546,034 | Lansing | Mar. 20, 1951 |

UNITED STATES PATENT OFFICE
CERTIFICATE OF CORRECTION

Patent No. 2,973,121                          February 28, 1961

Oscar H. Banker

It is hereby certified that error appears in the above numbered patent requiring correction and that the said Letters Patent should read as corrected below.

Column 1, line 15, for "relatest" read -- relates --; column 2, line 54, for "side" read -- sides --; line 64, for "to", first occurrence, read -- of --; column 5, lines 28 and 59, for "line", each occurrence, read -- lines --; column 6, line 72, for "bath" read -- both --.

Signed and sealed this 5th day of September 1961.

(SEAL)
Attest:

ERNEST W. SWIDER
Attesting Officer

DAVID L. LADD
Commissioner of Patents

USCOMM-DC